(12) United States Patent
Sako et al.

(10) Patent No.: US 9,660,724 B2
(45) Date of Patent: May 23, 2017

(54) COMMUNICATION APPARATUS AND STORAGE MEDIUM

(71) Applicant: Sony Corporation, Tokyo (JP)

(72) Inventors: Yoichiro Sako, Tokyo (JP); Takushi Kunihiro, Tokyo (JP); Kazuyuki Sakoda, Chiba (JP); Mitsuru Takehara, Tokyo (JP); Kento Suzuki, Kanagawa (JP); Makoto Akagi, Kanagawa (JP); Kouichirou Ono, Tokyo (JP); Katsuhito Ishida, Kanagawa (JP); Tomoya Onuma, Shizuoka (JP); Michihiro Kobayashi, Tokyo (JP); Akira Tange, Tokyo (JP); Takatoshi Nakamura, Kanagawa (JP); Hiroyuki Hanaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 147 days.

(21) Appl. No.: 14/074,964

(22) Filed: Nov. 8, 2013

(65) Prior Publication Data

US 2014/0140703 A1    May 22, 2014

(30) Foreign Application Priority Data

Nov. 19, 2012 (JP) ................................. 2012-253079

(51) Int. Cl.
*H04B 10/00* (2013.01)
*H04B 10/114* (2013.01)
*H04B 10/116* (2013.01)

(52) U.S. Cl.
CPC .......... *H04B 10/114* (2013.01); *H04B 10/116* (2013.01)

(58) Field of Classification Search
CPC ............................. H04B 10/116; H04B 10/114
USPC ........................................ 398/198, 115–118
See application file for complete search history.

(56) References Cited

U.S. PATENT DOCUMENTS

| | | | | |
|---|---|---|---|---|
| 5,479,408 A | * | 12/1995 | Will ..................... | G08B 3/1083 340/7.21 |
| 7,539,533 B2 | * | 5/2009 | Tran ..................... | A61B 5/0022 600/509 |
| 8,457,668 B2 | * | 6/2013 | Speede ................... | H04W 4/14 455/466 |
| 8,958,291 B2 | * | 2/2015 | Ji .......................... | H04W 40/12 370/230 |
| 2002/0109885 A1 | * | 8/2002 | Aburakawa .......... | H04B 10/032 398/121 |
| 2002/0122230 A1 | * | 9/2002 | Izadpanah .......... | H04B 10/1121 398/115 |

(Continued)

FOREIGN PATENT DOCUMENTS

JP      2006-352562 A    12/2006
JP      2009-010487 A    1/2009

*Primary Examiner* — Ken N Vanderpuye
*Assistant Examiner* — Abbas H Alagheband
(74) *Attorney, Agent, or Firm* — Chip Law Group

(57) ABSTRACT

There is provided a communication apparatus including a communication unit having an optical communication scheme and a different communication scheme from the optical communication scheme, a level setting unit configured to set a security level in data communication, and a communication scheme switching unit configured to switch communication schemes of the communication unit in accordance with the security level that is set by the level setting unit.

14 Claims, 7 Drawing Sheets

(56) References Cited

U.S. PATENT DOCUMENTS

| | | | |
|---|---|---|---|
| 2002/0131123 A1* | 9/2002 | Clark | H04B 10/1125 398/118 |
| 2003/0126243 A1* | 7/2003 | Kudo | H04L 29/12254 709/222 |
| 2004/0015693 A1* | 1/2004 | Kitazumi | H04L 63/0428 713/171 |
| 2005/0132070 A1* | 6/2005 | Redlich | G06F 21/6209 709/228 |
| 2006/0019679 A1* | 1/2006 | Rappaport | H04W 64/00 455/456.5 |
| 2008/0199184 A1* | 8/2008 | Takeshita | H04L 63/08 398/115 |
| 2008/0291074 A1* | 11/2008 | Tzeng | G08C 17/02 341/176 |
| 2008/0304833 A1* | 12/2008 | Zheng | H04B 10/1143 398/135 |
| 2010/0111543 A1* | 5/2010 | Chow | H04B 10/2587 398/194 |
| 2010/0141153 A1* | 6/2010 | Recker | H05B 33/0803 315/149 |
| 2010/0271802 A1* | 10/2010 | Recker | H05B 33/0803 362/20 |
| 2010/0327766 A1* | 12/2010 | Recker | H02J 9/02 315/291 |
| 2011/0110661 A1* | 5/2011 | Grubor | H04B 10/1143 398/38 |
| 2011/0164878 A1* | 7/2011 | Ma | H04B 10/1149 398/79 |
| 2012/0027409 A1* | 2/2012 | Agrawal | H04B 10/1129 398/58 |
| 2012/0184248 A1* | 7/2012 | Speede | H04W 4/14 455/411 |
| 2013/0080479 A1* | 3/2013 | Fuchs | G06F 17/30286 707/802 |
| 2013/0101285 A1* | 4/2013 | Shar | H04B 10/1149 398/38 |
| 2014/0072119 A1* | 3/2014 | Hranilovic | H04L 9/3215 380/270 |
| 2014/0285145 A1* | 9/2014 | Patro | H02J 7/025 320/108 |
| 2015/0163867 A1* | 6/2015 | Recker | H02J 9/02 315/250 |

* cited by examiner

COMMUNICATION APPARATUS AND STORAGE MEDIUM

CROSS REFERENCE TO RELATED APPLICATIONS

This application claims the benefit of Japanese Priority Patent Application JP 2012-253079 filed Nov. 19, 2012, the entire contents of which are incorporated herein by reference.

BACKGROUND

The present disclosure relates to a communication apparatus and a storage medium.

Mobile communication terminals such as mobile phones, tablet terminals, smartphones, and notebook personal computers (PCs) generally transmit data to and receive data from external apparatuses through radio wave communication such as a wireless LAN, Wi-Fi, and Bluetooth (registered trademark).

In recent years, a technique for performing wireless communication by use of visible light has been proposed. For example, the technique enables an illumination apparatus to emit visible light, and information to be concurrently delivered to a portable terminal. Since an irradiation range of light is the same as a communication range of information in visible light communication, users can advantageously grasp the communication range with ease. For example, JP 2006-352562A and JP 2009-10487A are disclosed as techniques for visible light communication.

JP 2006-352562A discloses a visible light communication lighting device including an irradiator configured to irradiate a predetermined irradiation range with visible light, and a light quantity changer configured to change light quantity of the visible light, the visible light communication lighting device being capable of adjusting the irradiation range and the light quantity of the visible light even in a case where a layout of an exhibition article is changed.

JP 2009-10487A discloses a secure visible light communication system including an illumination apparatus configured to perform visible light communication, and an information apparatus configured to be operable upon receiving decryption information superimposed on light radiated by the illumination apparatus.

SUMMARY

However, both of JP 2006-352562A and JP 2009-10487A mention nothing on a technique for switching visible light communication and radio wave communication.

Accordingly, the present disclosure proposes a communication apparatus and a storage medium that are novel and improved, and can perform switching control such that optical communication and another type of communication are switched.

According to an embodiment of the present disclosure, there is provided a communication apparatus including a communication unit having an optical communication scheme and a different communication scheme from the optical communication scheme, a level setting unit configured to set a security level in data communication, and a communication scheme switching unit configured to switch communication schemes of the communication unit in accordance with the security level that is set by the level setting unit.

According to another embodiment of the present disclosure, there is provided a non-transitory computer-readable storage medium having a program stored therein, the program causing a computer to function as a communication unit having an optical communication scheme and a different communication scheme from the optical communication scheme, a level setting unit configured to set a security level in data communication, and a communication scheme switching unit configured to switch communication schemes of the communication unit in accordance with the security level that is set by the level setting unit.

According to one or more of embodiments of the present disclosure, it becomes possible to perform switching control such that optical communication and another type of communication are switched.

DETAILED DESCRIPTION OF THE EMBODIMENT(S)

Figure 1:
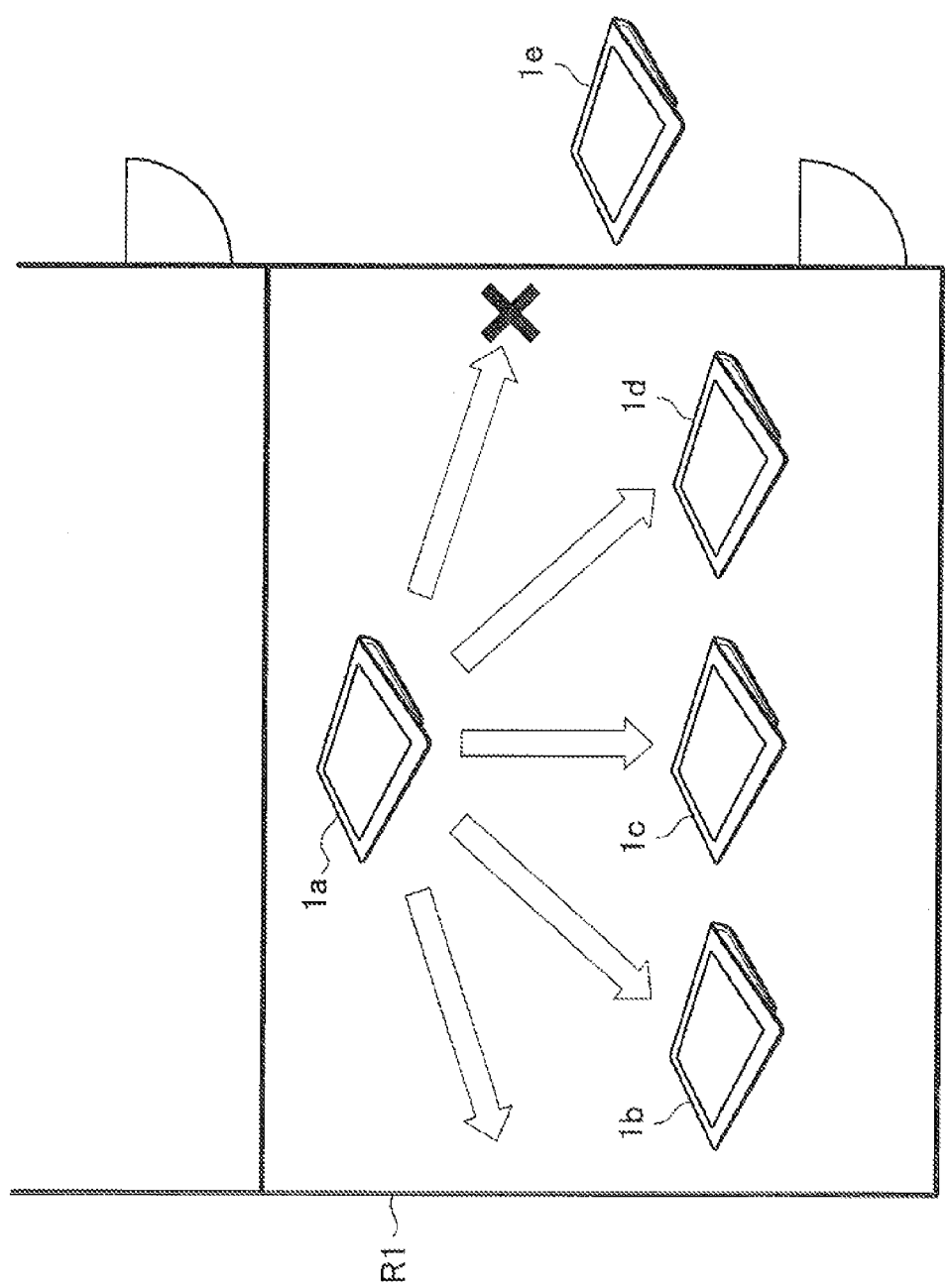
FIG. 1 is a diagram for describing an overview of a communication control system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Overview of Communication Control System according to Embodiment of Present Disclosure
2. Configuration of Communication Terminal
3. Operation Process
4. Conclusion <1. Overview of Communication Control System According to Embodiment of Present Disclosure>

First of all, with reference to FIG. 1, an overview of a communication control system according to an embodiment of the present disclosure will be described.

FIG. 1 is a diagram for describing an overview of a communication control system according to an embodiment of the present disclosure. As illustrated in FIG. 1, communication terminals 1a to 1e (that will also be generically referred to as a communication terminal 1, hereinafter) according to the present embodiment are disposed in a meeting room R1 and a passage.

The communication terminal 1 is a communication apparatus that can transmit data to and receive data from an external apparatus through wireless communication, and carried by a user. FIG. 1 illustrates a tablet terminal as an example of the communication terminal 1, but the communication terminal is not limited thereto. For example, the communication terminal 1 may also be an illumination apparatus, a mobile phone, a personal handy-phone system (PHS), a smartphone, a personal digital assistant (PDA), or a notebook personal computer (PC).

The communication terminal 1 according to the present embodiment can also perform switching control such that optical communication and radio wave communication are switched in accordance with a security level. Optical communication travels more linearly than radio wave communication. Accordingly, when optical communication is performed in a room from which light does not go out, it is easier to prevent information leakage. Especially visible light communication advantageously allows the reach of light (data) to be visually confirmed.

For example, as illustrated in FIG. 1, when data of minutes is desired to be transmitted only to the inside of the meeting room R1, the communication terminal 1a switches communication to optical communication to transmit the data of minutes. The communication terminals 1b to 1d positioned in the meeting room R1 receive light radiated from the communication terminal 1a, and can acquire the data of minutes. To the contrary, the communication terminal 1e positioned outside the meeting room R1 fails to receive the light from the communication terminal 1a because a wall blocks the light. Consequently, the communication terminal 1e fails to acquire the data of minutes.

Data is transmitted through optical communication in a room in this way in the present embodiment, which prevents information to leak from the room and establishes a secure space in the room.

As above, the overview of the communication control system according to the embodiment of the present disclosure has been described. Next, a configuration of the communication terminal 1 included in the communication control system according to the present embodiment, and an operation process of the communication control system will be described one by one.

<2. Configuration of Communication Terminal>

Figure 2:
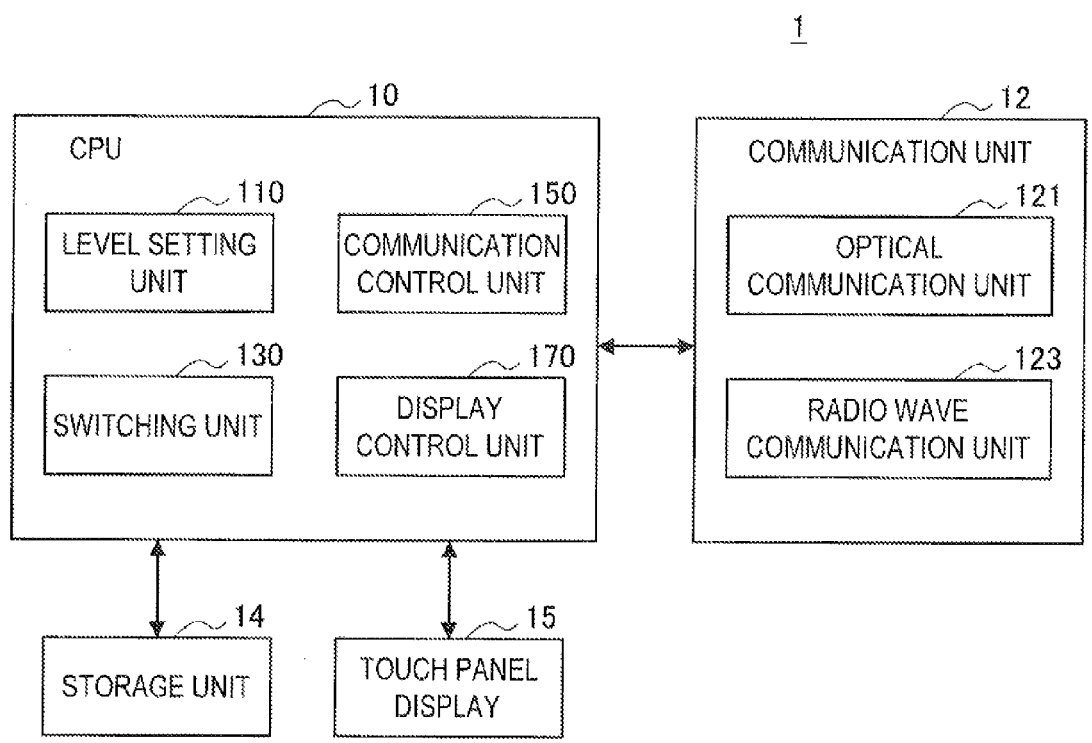
FIG. 2 is a block diagram illustrating an internal configuration example of a communication terminal according to the present embodiment.

FIG. 2 is a block diagram illustrating an internal configuration example of the communication terminal 1 according to the present embodiment. As illustrated in FIG. 2, the communication terminal 1 according to the present embodiment includes a central processing unit (CPU) 10, a communication unit 12, a storage unit 14, and a touch panel display 15.

(CPU)

The CPU 10 is a control unit that issues a command to each configuration of the communication terminal 1, and controls the whole communication terminal 1. Specifically, as illustrated in FIG. 2, the CPU 10 functions as a level setting unit 110, a switching unit 130, a communication control unit 150, and a display control unit 170.

The level setting unit 110 sets a security level in data communication. More specifically, the level setting unit 110 may set a security level in accordance with contents of data that are transmitted through data communication, or a user operation. For example, if data that is transmitted is subjected to a view restriction or an editorial restriction, or includes a predetermined keyword (such as "company secret" and "confidential"), the level setting unit 110 sets a security level of data communication to be higher than a predetermined value. If data that is transmitted is time data, which is set to be automatically deleted after a predetermined time, the level setting unit 110 may also set a security level of data communication to be higher than a predetermined value.

Figure 3:
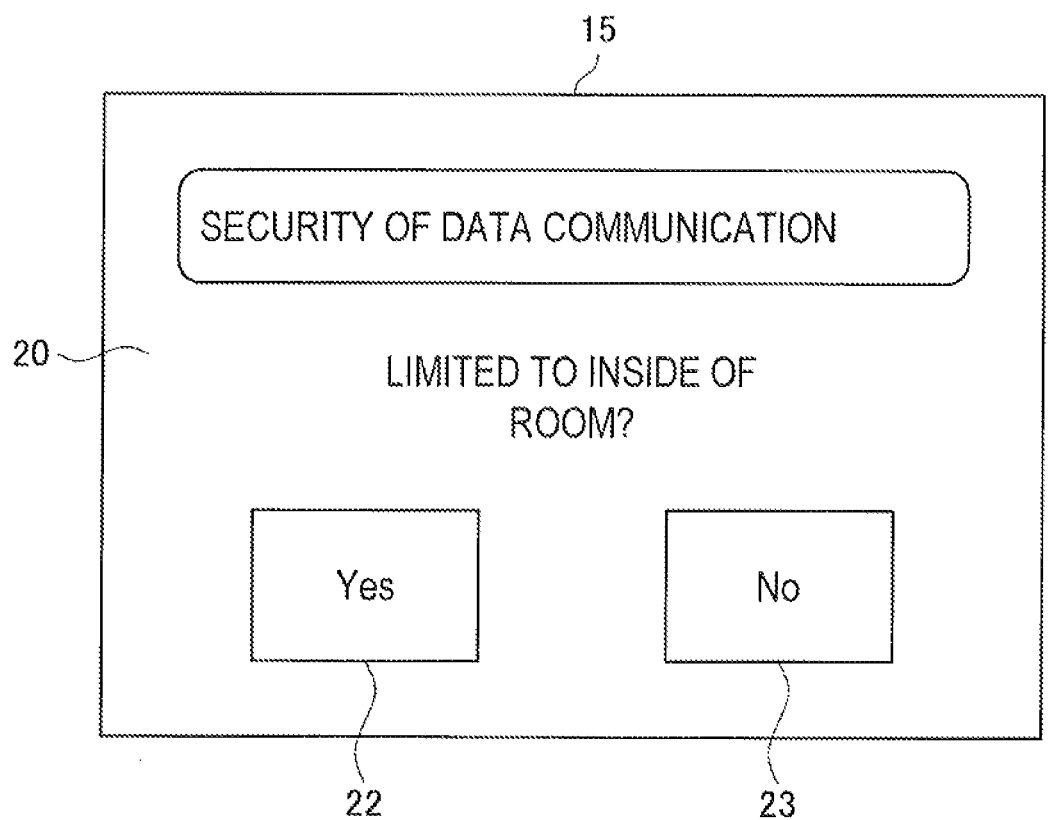
FIG. 3 is a diagram illustrating an example of an operation screen according to the present embodiment, which is displayed for setting a security level of data communication.

The level setting unit 110 may also set a security level of data communication to be higher than a predetermined value in accordance with a user operation. Here, FIG. 3 illustrates an example of an operation screen for setting a security level of data communication. As illustrated in FIG. 3, the touch panel display 15 of the communication terminal 1 displays an operation screen 20. The operation screen 20 includes display of text "limited to inside of room?," a Yes button 22, and a No button 23. If a user limits a range of data communication to the inside of a room, the user taps and selects the display of the Yes button 22. In this case, the level setting unit 110 sets a security level of data communication to be higher than a predetermined value.

The switching unit 130 is a communication scheme switching unit that switches the communication scheme of the communication unit 12 in accordance with a security level that is set by the level setting unit 110. As described below, the communication unit 12 according to the present embodiment has an optical communication scheme and a radio wave communication scheme. Accordingly, the switching unit 130 performs control such that the communication scheme of the communication unit 12 is switched to an optical communication scheme or a radio wave communication scheme in accordance with a security level. More specifically, the switching unit 130 switches the communication scheme to an optical communication scheme when a security level is higher than a predetermined value.

The communication control unit 150 controls communication performed by the communication unit 12. Specifically, after the communication unit 12 transmits data in an optical communication scheme, the communication control unit 150 performs predetermined control in accordance with a type of the transmitted data such that information does not leak.

Specifically, after the communication unit 12 transmits time data in an optical communication scheme, the communication control unit 150 performs control such that the time data is continuously transmitted in an optical communication scheme. Thus, as long as another communication terminal is positioned in the room (reach of light), the other communication terminal can continuously acquire the time data. Accordingly, a user who uses the other communication terminal can also view the time data. When the other communication terminal is moved from the room, the other communication terminal is incapable of newly acquiring the time data. Accordingly, once the time data that has been already acquired by the other communication terminal is deleted after a predetermined time, the user can no longer view the time data. In this way, the communication control unit 150 securely limits acquisition and view of time data to the inside of a room to prevent information leakage.

If data that is transmitted by the communication unit in an optical communication scheme is not time data (which namely means that data is normal data), the communication control unit 150 continuously receives Ack (ACKnowledgement; positive response) from a destination device (the other communication apparatus) in an optical communication scheme after the data is transmitted. Once Ack is no longer received, the communication control unit 150 performs control such that a control signal for deleting the data that has been transmitted to the destination device is transmitted to the destination device in a radio wave communication scheme. Thus, as long as the other communication terminal is positioned in the room, data that has been received from the communication terminal can be retained. When the other communication terminal is moved from the room, the control signal from the communication terminal causes the data to be deleted. The communication control unit 150 according to the present embodiment can hereby enhance security in the room and prevent information leakage.

The display control unit 170 controls a display function of the touch panel display 15, and performs control such that various menu screens and operation screens are displayed. For example, the display control unit 170 performs control such that the touch panel display 15 displays the operation screen 20 as described with reference to FIG. 3.

(Communication Unit)

The communication unit 12 is a communication interface that transmits data to and receives data from an external apparatus. The communication unit 12 according to the present embodiment has an optical communication scheme, and a communication scheme different from the optical communication scheme. The communication scheme different from the optical communication scheme is, for example, a radio wave communication scheme. As illustrated in FIG. 2, the communication unit 12 includes an optical communication unit 121 and a radio wave communication unit 123.

The optical communication unit 121 has a function of performing data communication with data superimposed on radiated light. For example, the optical communication unit 121 performs data communication through visible light communication, infrared communication, or ultraviolet communication. Specifically, the optical communication unit 121 may be realized by a light emitting unit, a radiation unit, a modulation unit, or the like. The light emitting unit includes, for example, one or more light emitting diodes (LED), and emits visible light to perform illumination. The radiation unit includes, for example, a lens, and transmits the visible light emitted from the light emitting unit to irradiate a predetermined irradiation range with the transmitted visible light. The modulation unit modulates the visible light emitted from the light emitting unit to a waveform having a predetermined data length on the basis of the data, and transmits the data through visible light communication.

Additionally, the optical communication unit 121 may explicitly notify a user such that the user intuitively understands that optical communication is being performed, by controlling at least one of light quantity, luminance, and a color of the radiated visible light.

The radio wave communication unit 123 has a function of performing data communication by transmitting and receiving radio waves. For example, the radio wave communication unit 123 performs data communication by use of a wireless LAN, Bluetooth (registered trademark), and Wi-Fi.

Additionally, the radio wave communication unit 123 may adjust the reach of the data by controlling at least one of radio field intensity and directivity.

(Storage Unit 14)

The storage unit 14 stores various programs and various data files for the CPU 10 to execute each process.

(Touch Panel Display)

The touch panel display 15 is an example of a device that integrates a display function and an operation input function. The touch panel display 15 displays a predetermined screen on the display in accordance with a command from the display control unit 170 of the CPU 10. The touch panel display also outputs a detected user operation to the CPU 10 as operation input data. Additionally, the display function and the operation input function according to the present embodiment are not necessarily integrated with each other, but may be separately realized.

As above, the internal configuration of the communication terminal 1 according to the present embodiment has been described. Next, with reference to FIGS. 4 to 6, an operation process of the communication control system according to the present embodiment will be described.

<3. Operation Process>

(3-1. Communication Control Process)

Figure 4:
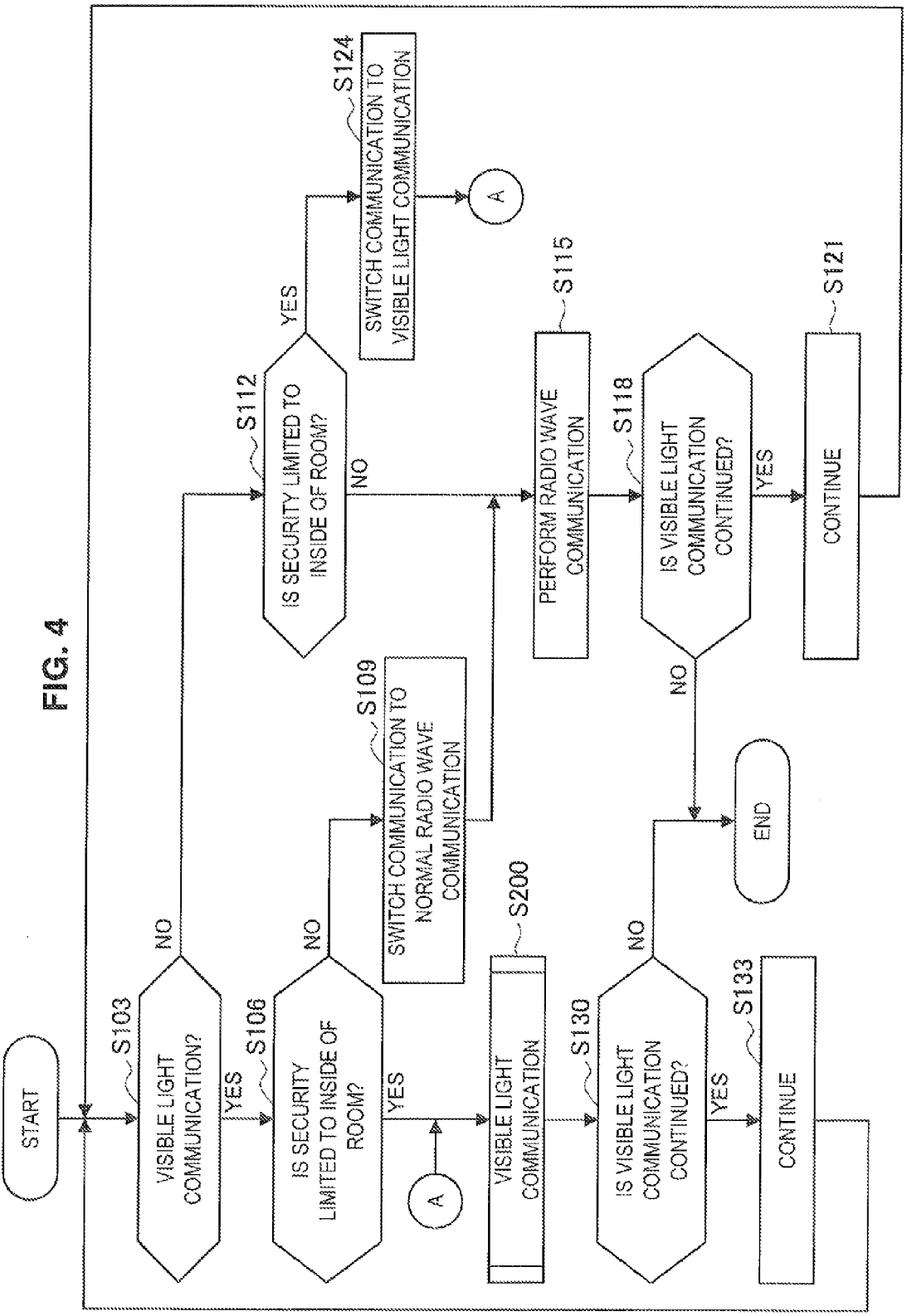
FIG. 4 is a flowchart illustrating a communication control process according to the present embodiment.

First of all, with reference to FIG. 4, a communication control process according to the present embodiment will be described. FIG. 4 is a flowchart illustrating a communication control process according to the present embodiment. Additionally, here, the communication terminal 1 uses visible light communication as an example of optical communication.

As illustrated in FIG. 4, first, in step S103, the CPU 10 determines whether the communication scheme of the communication unit 12 is visible light communication.

Figure 5:
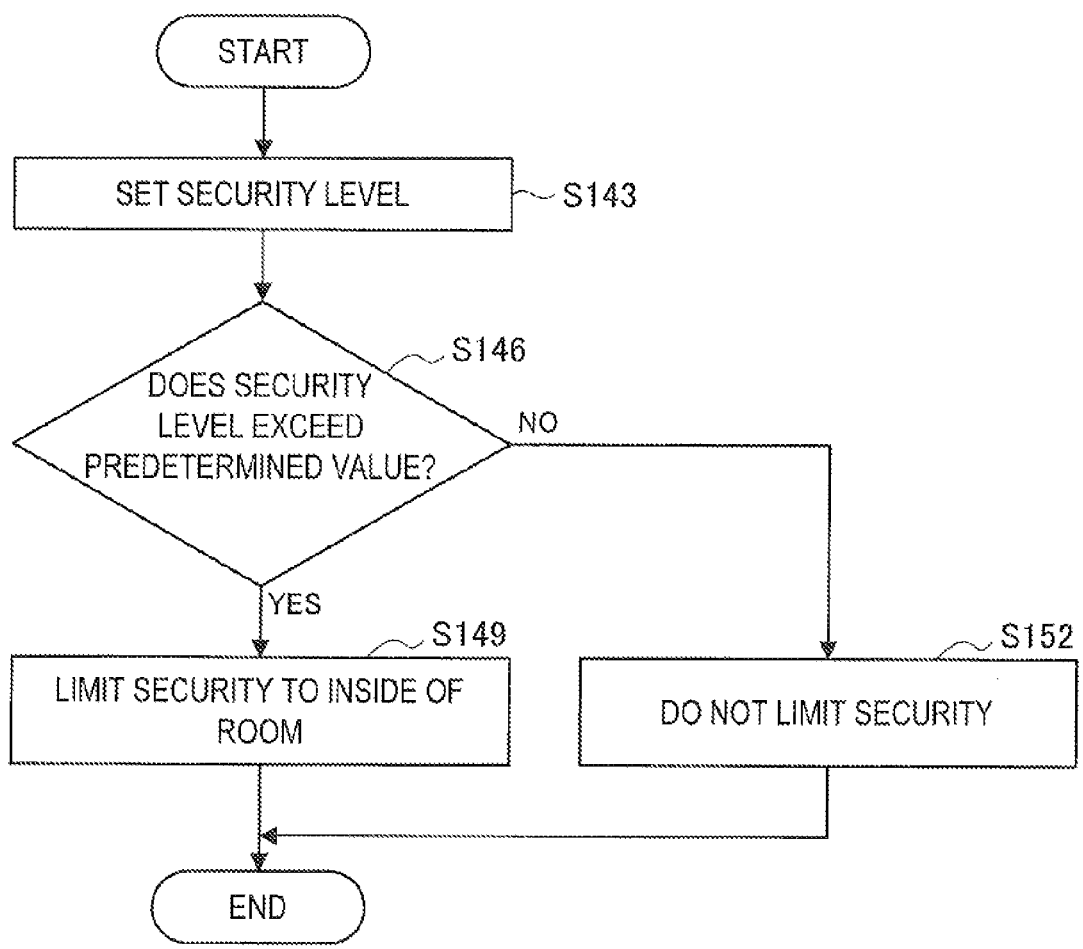
FIG. 5 is a flowchart illustrating a process according to the present embodiment, which is performed for determining whether to limit security to an inside of a room.

Next, if the communication scheme is visible light communication (S103/Yes), the CPU 10 determines, in step S106, whether to limit security (range of data communication) to the inside of a room. With reference to FIG. 5, a process of determining whether to limit security to the inside of the room will be described below.

Figure 6:
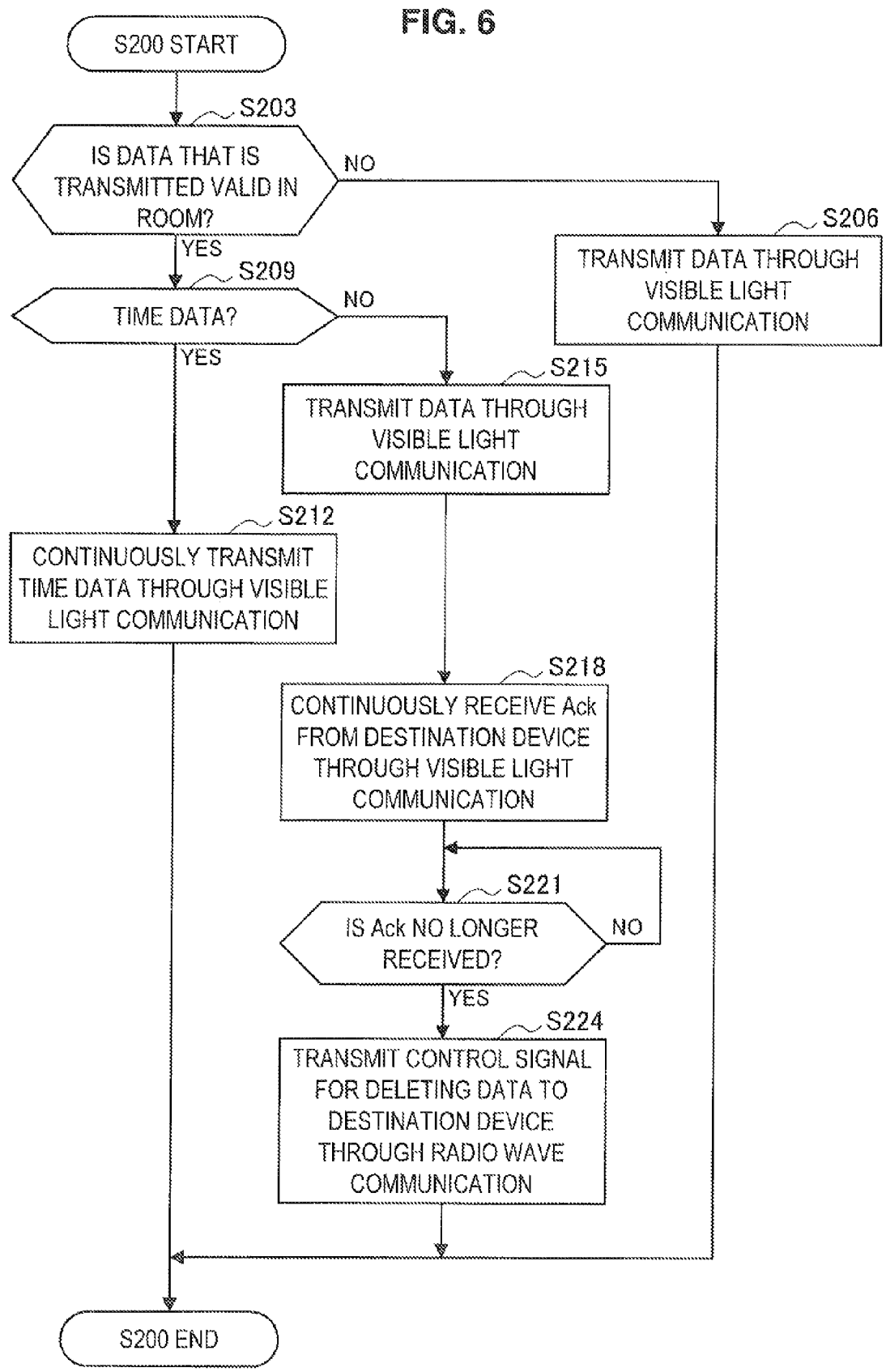
FIG. 6 is a flowchart illustrating a process of visible light communication according to the present embodiment.

Subsequently, if security is limited to the inside of the room (S106/Yes), the CPU 10 performs, in step S200, visible light communication by use of the optical communication unit 121 of the communication unit 12. With reference to FIG. 6, a specific process of visible light communication will be described below.

Next, after visible light communication is finished, the CPU 10 determines, in step S130, whether to continue visible light communication. Specifically, the CPU 10 determines whether to continue visible light communication, in accordance with a user operation or setting.

Next, if it is determined to continue visible light communication (S130/Yes), the CPU 10 continues, in step S133, visible light communication as the communication scheme of the communication unit 12.

To the contrary, if the communication scheme of the communication unit 12 is radio wave communication in S103 (S103/No), the CPU 10 determines, in step S112, whether to limit security (range of data communication) to the inside of the room.

Next, if security is limited to the inside of the room (S112/Yes), the switching unit 130 of the CPU 10 switches, in step S124, the communication scheme of the communication unit 12 to visible light communication. In S200, the CPU 10 performs visible light communication.

If security is not limited to the inside of the room (S112/No), the CPU 10 performs, in step S115, radio wave communication by use of the radio wave communication unit 115 of the communication unit 12.

To the contrary, if it is determined, in S106, that security is not limited to the inside of the room (S106/No), the switching unit 130 of the CPU 10 switches, in step S109, the communication scheme of the communication unit 12 to radio wave communication. In S115, the CPU 10 performs radio wave communication by use of the radio wave communication unit 115 of the communication unit 12.

Subsequently, after radio wave communication is finished, the CPU 10 determines, in step S118, whether to continue radio wave communication. Specifically, the CPU 10 determines whether to continue radio wave communication, in accordance with a user operation or setting.

Subsequently, if it is determined to continue radio wave communication (S118/Yes), the CPU 10 continues, in step S121, radio wave communication as the communication scheme of the communication unit 12.

As above, the communication control process according to the present embodiment has been specifically described. Next, with reference to FIG. 5, the "process for determining whether to limit security to the inside of a room" shown in S106 and S112 will be specifically described.

(3-2. Determination Process)

FIG. 5 is a flowchart illustrating a process according to the present embodiment, which is performed for determining whether to limit security to the inside of a room.

As illustrated in FIG. 5, in step S143, the level setting unit 110 of the CPU 10 sets a security level of data communication. As described above, the level setting unit 110 sets a security level in accordance with a user operation or contents of data that is transmitted.

Subsequently, in step S146, the switching unit 130 of the CPU 10 determines whether the security level of data communication that has been set by the level setting unit 110 exceeds a predetermined value.

Next, if the security level exceeds the predetermined value (S146/Yes), the switching unit 130 determines, in step S149, that security is limited to the inside of the room, and switches the communication scheme of the communication unit 12 to visible light communication if the communication scheme of the communication unit 12 has not been visible light communication, as shown in S124 of FIG. 4.

To the contrary, if the security level is lower than the predetermined value (S146/No), the switching unit 130 determines, in step S152, that security is not limited to the inside of the room, and switches the communication scheme of the communication unit 12 to radio wave communication if the communication scheme of the communication unit 12 has not been radio wave communication, as shown in S109 of FIG. 4.

As above, the process for determining whether to limit security to the inside of a room has been specifically described. Next, with reference to FIG. 6, the specific process of visible light communication shown in S200 will be described.

(3-3. Visible Light Communication)

FIG. 6 is a flowchart illustrating a process of visible light communication according to the present embodiment.

As shown in step S203 of FIG. 6, the CPU 10 determines whether data that is transmitted by the communication unit 12 through visible light communication is valid in a room. For example, the CPU 10 determines whether the data is valid in a room, in accordance with a user operation or a type of the data.

Next, if it is determined that the data is valid in the room (S203/Yes), the CPU 10 determines, in step S209, whether the data is time data.

Subsequently, if the data is time data (S209/Yes), the communication control unit 150 of the CPU 10 controls, in step S212, the communication unit 12 to continuously transmit the time data to a destination device (another communication terminal) through visible light communication. As described above, since the time data is automatically deleted after a predetermined time, information is less likely to leak. As long as the other communication terminal is positioned in the room, the other communication terminal can continuously acquire the time data from the communication terminal 1 through visible light communication. Accordingly, a user of the other communication terminal can continuously view the time data.

To the contrary, if the data is not time data (S209/No), the communication control unit 150 of the CPU 10 controls, in step S215, the communication unit 12 to transmit the data to a destination device (another communication terminal) through visible light communication.

Next, in step S218, the CPU 10 continuously receives Ack from the other communication terminal, to which the data is transmitted, through visible light communication. The CPU 10 can determine that the other communication terminal is positioned in the same room while the CPU 10 is continuously receiving Ack from the other communication terminal through visible light communication.

Subsequently, if Ack from the other communication terminal is no longer received (S221/Yes), the communication control unit 150 controls, in step S224, the communication unit to transmit a control signal for deleting the transmitted data to the other communication terminal (destination device) through radio wave communication. Transmitting a control signal to the other communication terminal, which is moved from the room, through radio wave communication, and deleting the transmitted data can hereby prevent information leakage in the present embodiment.

If content that is transmitted is not valid in the room in step S203 (S203/No), the communication control unit 150 controls, in step S206, the communication unit 12 to transmit the data through visible light communication. In this case, the content that is transmitted in S206 is not time data as shown in S209, and is not controlled to be deleted after transmitted, as shown in S215 to S224. Thus, different from the content that is transmitted in S215, the content that is transmitted in S206 is retained by the destination device even if the device that has transmitted the content is moved from the room.

As described above, it is possible to enhance security by the communication control unit 150 performing predetermined control in accordance with a type of the data (whether the data is valid in a room) that is transmitted through optical communication.

(Supplement)

Figure 7:
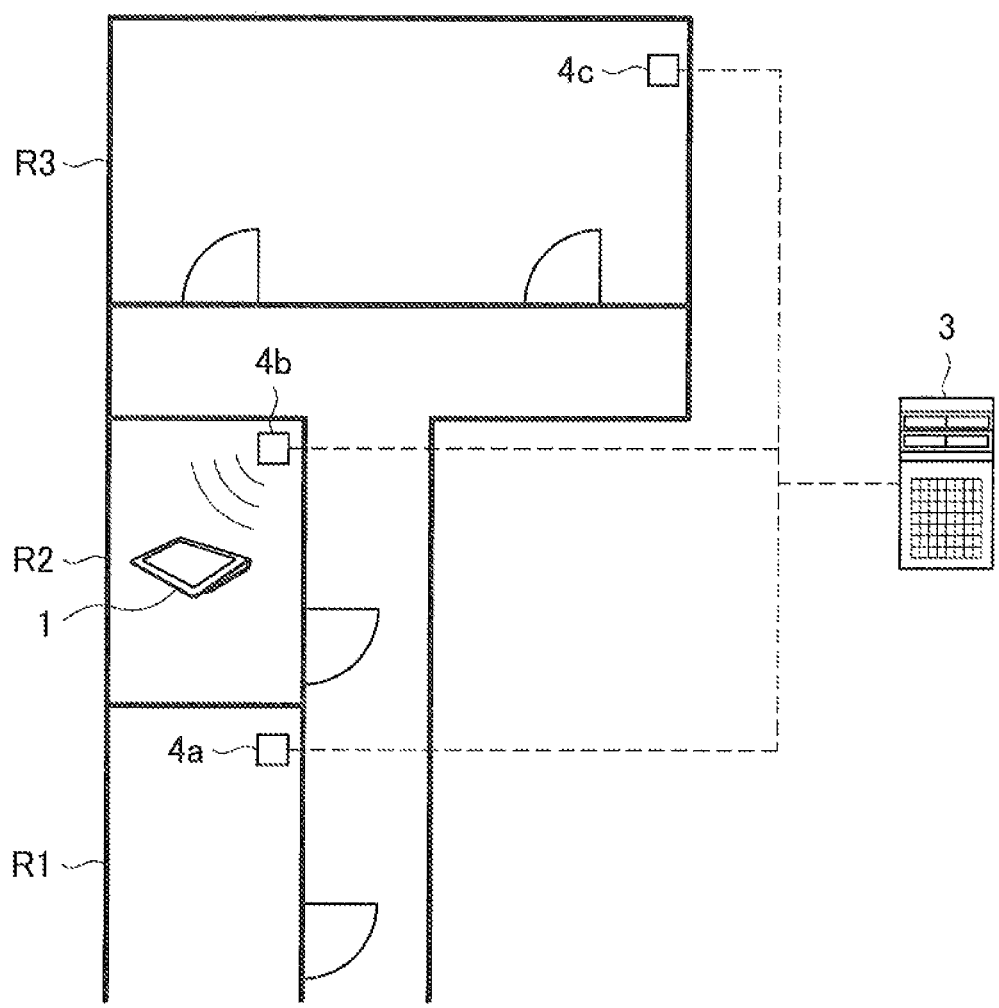
FIG. 7 is a diagram for describing another communication control system according to the present embodiment.

Next, with reference to FIG. 7, the communication control system according to the present embodiment will be supplemented. FIG. 7 is a diagram for describing another communication control system according to the present embodiment. As illustrated in FIG. 7, the other communication control system according to the present embodiment includes a terminal apparatus 1 and a server 3. The server 3 controls security levels of data communication in meeting rooms R1 to R3. More specifically, the server 3 transmits command signals for setting the security levels of data communication to the communication terminal 1 positioned in the room from access points (AP) 4a to 4c disposed in the meeting rooms R1 to R3.

For example, the server 3 transmits a command for setting the security level of data communication to be higher than a predetermined value from the AP 4b disposed in the meeting room R2 to the communication terminal 1 disposed in the meeting room R2. In this case, the level setting unit 110 of the communication terminal 1 sets a security level of data communication to be higher than a predetermined value in accordance with the command from the server 3. The switching unit 130 switches the communication scheme of the communication unit 12 to optical communication in accordance with the security level that has been set by the level setting unit 110.

In this way, the communication control system according to the present embodiment sets a higher security level for a predetermined meeting room of the multiple meeting rooms R1 to R3, and can construct an environment that allows confidential data to be securely transmitted and received.

Additionally, the AP 4a to 4c illustrated in FIG. 7 may also transmit the commands from the server 3 to the communication terminal 1 positioned in the room through optical communication.

In the above-described examples, a meeting room of a company is used. However, in addition, a security level may also be controlled for a private room of a hotel, a Japanese restaurant, a restaurant, or the like such that an environment allowing confidential data to be securely transmitted and received is constructed.

<4. Conclusion>

As described above, the communication control system according to the present embodiment allows switching control to be performed such that optical communication and another type of communication are switched. Specifically, in the present embodiment, communication is switched to optical communication when secure data communication limited to the inside of a room is performed, while communication is switched to radio wave communication when less secure data communication or access to the outside of the room is necessary. In this way, switching multiple communication schemes that have different reach of data allows a secure communication environment to be constructed in a room without any authentication mechanism.

For example, when confidential data of minutes is desired to be transmitted to only participants in a meeting room of a company, data communication is performed by switching communication to optical communication. Accordingly, the data can be transmitted with a transmission range of the data limited to the inside of the room.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, the communication control system, which limits security of data communication to the inside of a room by switching communication to optical communication, may also be applied to the room when it is desired that only members in the room can participate in a game by using each communication terminal 1.

In addition, the communication control system may be applied to a concert hall when a program is delivered only to each communication terminal 1 held by the audience on the spot.

Additionally, the present technology may also be configured as below.

(1) A communication apparatus including:

a communication unit having an optical communication scheme and a different communication scheme from the optical communication scheme;

a level setting unit configured to set a security level in data communication; and a communication scheme switching unit configured to switch communication schemes of the communication unit in accordance with the security level that is set by the level setting unit.

(2) The communication apparatus according to (1), wherein, after time data is transmitted in the optical communication scheme, the communication unit continuously transmits the time data in the optical communication scheme.

(3) The communication apparatus according to (1) or (2), wherein, after data is transmitted in the optical communication scheme, the communication unit continuously receives, in the optical communication scheme, a response from a destination device to which the data is transmitted, and transmits a control signal for deleting the transmitted data to the destination device in the different communication scheme when the response is no longer received.

(4) The communication apparatus according to any one of (1) to (3), wherein, when the security level is higher than a predetermined value that is set in advance, the communication scheme switching unit switches the communication scheme to the optical communication scheme.

(5) The communication apparatus according to any one of (1) to (4), wherein the level setting unit sets the security level in accordance with a content of data that is transmitted through data communication, or a user operation.

(6) The communication apparatus according to any one of (1) to (4), wherein the level setting unit sets the security level in accordance with a command from a server.

(7) The communication apparatus according to any one of (1) to (6), wherein the different communication scheme is radio wave communication.

(8) The communication apparatus according to (7), wherein the communication unit controls radio field intensity and/or directivity in accordance with a transmission range.

(9) The communication apparatus according to any one of (1) to (8), wherein the optical communication scheme is visible light communication, infrared communication, or ultraviolet communication.

(10) The communication apparatus according to any one of (1) to (9), wherein the communication unit performs optical communication by use of an LED illumination unit.

(11) The communication apparatus according to any one of (1) to (10), wherein the communication unit controls light quantity, luminance, and/or a color in a manner that the communication unit explicitly indicates that optical communication is being performed.

(12) The communication apparatus according to any one of (1) to (11), wherein the communication apparatus is an illumination apparatus, a mobile phone, a PHS, a smartphone, a tablet terminal, a PDA, or a notebook PC.

(13) A non-transitory computer-readable storage medium having a program stored therein, the program causing a computer to function as:

a communication unit having an optical communication scheme and a different communication scheme from the optical communication scheme;

a level setting unit configured to set a security level in data communication; and a communication scheme switching unit configured to switch communication schemes of the communication unit in accordance with the security level that is set by the level setting unit.

What is claimed is:

1. A communication apparatus, comprising:
 a communication unit having an optical communication scheme as a first communication scheme, and a second communication scheme different from the optical communication scheme;
 a level setting unit configured to set a security level in data communication,
 wherein the level setting unit is configured to set the security level, which is used to determine a communication scheme for the data communication, higher than a determined value based on a determination that data to be transmitted is set to be automatically deleted after a determined time; and
 a communication scheme switching unit configured to switch the communication scheme of the communication unit between the first communication scheme and the second communication scheme based on the security level set by the level setting unit.

2. The communication apparatus according to claim 1, wherein, after time data is transmitted in the optical communication scheme, the communication unit is further configured to continuously transmit the time data in the optical communication scheme.

3. The communication apparatus according to claim 1, wherein, based on a determination that the security level is set higher than the determined value that is set in advance, the communication scheme switching unit is further configured to switch the communication scheme to the optical communication scheme.

4. The communication apparatus according to claim 1, wherein the level setting unit is further configured to set the security level based on a content of the data transmitted through the data communication, or a user operation.

5. The communication apparatus according to claim 1, wherein the level setting unit is further configured to set the security level based on a command from a server.

6. The communication apparatus according to claim 1, wherein the second communication scheme corresponds to radio wave communication.

7. The communication apparatus according to claim 6, wherein the communication unit is further configured to control radio field intensity or directivity of the radio wave communication based on a transmission range of the data.

8. The communication apparatus according to claim 1, wherein the optical communication scheme is one of visible light communication, infrared communication, or ultraviolet communication.

9. The communication apparatus according to claim 1, wherein the communication unit is further configured to communicate through the optical communication scheme by use of an LED illumination unit.

10. The communication apparatus according to claim 1, wherein the communication unit is further configured to control light quantity, luminance, or a color of radiated visible light, such that the communication unit is further configured to explicitly indicate that the data is transmitted through the optical communication scheme.

11. The communication apparatus according to claim 1, wherein the communication apparatus is one of an illumination apparatus, a mobile phone, a personal handy-phone system (PHS), a smartphone, a tablet terminal, a personal digital assistant (PDA), or a notebook computer.

12. A non-transitory computer-readable storage medium having stored thereon, computer-executable instructions for causing a computer to execute operations, comprising:
 setting a security level in data communication,
 wherein the security level used to determine a communication scheme for the data communication is set higher than a determined value based on a determination that data to be transmitted is set to be automatically deleted after a determined time; and
 switching the communication scheme of a communication unit between a first communication scheme and a second communication scheme based on the set security level,
 wherein the first communication scheme is an optical communication scheme and the second communication scheme is different from the optical communication scheme.

13. The communication apparatus according to claim 1,
 wherein, based on a determination that the data transmitted in the optical communication scheme is time data, the communication unit is further configured to continuously transmit the time data in the optical communication scheme, and
 wherein the time data is set to be automatically deleted after the determined time.

14. The communication apparatus according to claim 1, wherein, after the data is transmitted to a destination device in the optical communication scheme, the communication unit is further configured to continuously receive, in the optical communication scheme, a response from the destination device, and transmit a control signal for deleting the transmitted data to the destination device in the second communication scheme based on a determination that the response in the optical communication scheme is no longer received.

* * * * *